Patented Aug. 11, 1970 3,523,482

INVENTORS
HENRY W. PLOCH
CHARLES M. BURPO
BY Gravely, Lieder & Woodruff
ATTORNEYS

United States Patent

[11] 3,523,482

[72] Inventors Henry W. Ploch
 Chesterfield, Missouri;
 Charles M. Burpo, Florissant, Missouri
[21] Appl. No. 797,626
[22] Filed Feb. 7, 1969
[45] Patented Aug. 11, 1970
[73] Assignee McDonnell Douglas Corporation
 St. Louis County, Missouri
 a Corp. of Maryland

[54] ANCHOR
 11 Claims, 3 Drawing Figs.
[52] U.S. Cl. .................................................. 85/73,
 85/79, 151/41.73
[51] Int. Cl. ................................................ F16b 13/06
[50] Field of Search .................................. 85/73-76,
 79, 63, 32K, 8.8; 151/41.73, 41.7, 19; 287/124,
 52.09

[56] References Cited
UNITED STATES PATENTS

| | | | |
|---|---|---|---|
| 2,403,810 | 7/1946 | Lord.............................. | 151/41.73 |
| 2,470,924 | 5/1949 | Flogaus......................... | 85/83 |
| 3,175,455 | 3/1965 | Reddy............................ | 85/75 |

Primary Examiner— Ramon S. Britts
Attorney—Gravely, Lieder and Woodruff

ABSTRACT: An anchor having a body provided with means for preventing it from rotating in a hole and a ring embracing the body and expanded into engagement with the walls of the hole by the camming action of a tapered surface associated with it. The body is shifted axially in the hole by the passage of mating threads along one another, and this shifting movement causes the camming action which expands the ring.

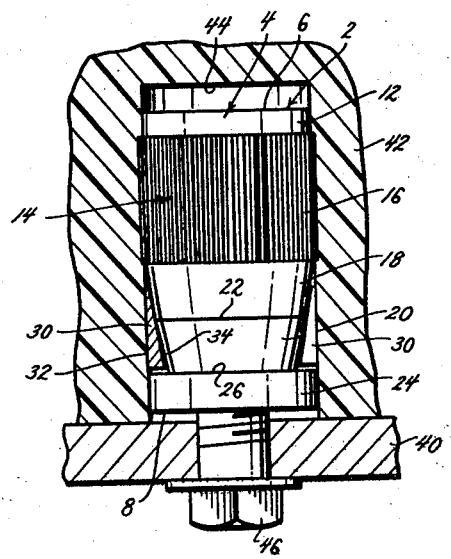

ANCHOR

This invention relates in general to anchors and more particularly to screw anchors for installation in bores formed in solid material.

Many materials such as plastics and some non-ferrous metals are simply not strong enough to retain threaded holding devices, and consequently other types of holding devices or anchors have been developed for use in these materials. The holding devices heretofore constructed, however, possess numerous parts and are otherwise unduly complicated. They are also difficult to install and many cannot be installed into downwardly opening holes.

In the case of stripped threads, they are generally restored by boring out the threaded hole and then tapping the hole so bored for reception of a larger threaded element. This is time consuming and requires specialized tools.

One of the principal objects of the present invention is to provide an anchor which may be used to secure threaded devices to material which is not strong enough to retain threads itself. Another object is to provide an anchor for replacing stripped threads without re-tapping the material in which the stripped threads exist. A further object is to provide an anchor of the type stated which is easy to install and can be installed without specialized tools or skills. An additional object is to provide an anchor which may be installed in any position. Still another object is to provide an anchor which is simple in construction and economical to manufacture. These and other objects and advantages will become apparent hereinafter.

The present invention is embodied in an anchor having a body adapted to be installed in a bore and a ring which embraces the body as well as engages the walls of the bore. When the body is shifted axially in the bore by the passage of mating threads along one another a tapered surface causes the ring to expand and lock the body in the bore.

The invention also consists in the parts and in the arrangements and combination of parts hereinafter described and claimed. In the accompanying drawings which form part of the specification and wherein like numerals and letters refer to like parts wherever they occur:

Figure 1:
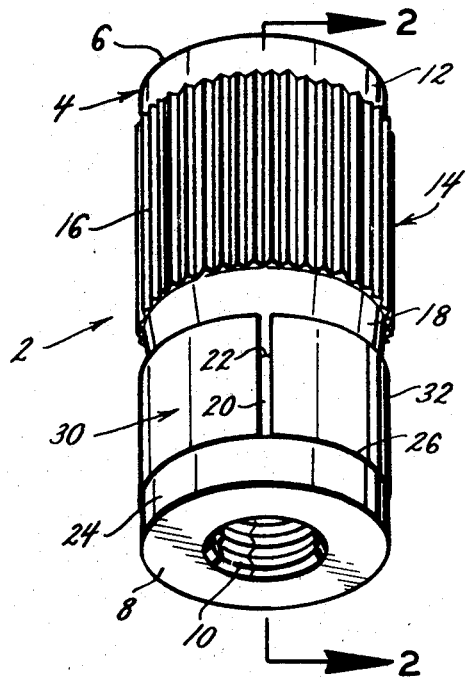
FIG. 1 is a perspective view of an anchor constructed in accordance with and embodying the present invention.

Referring now in detail to the drawings, 2 designates an anchor including a body 4 of circular cross-section having a leading end face 6 and a trailing end face 8 as well as a threaded bore 10 extending axially through it and opening outwardly through both end faces 6 and 8. The leading end face 8 forms the end of a cylindrical nose or lead portion 12 which merges at its opposite end into a diametrally enlarged gripping portion 14 having a plurality of axially extending serrations 16. The gripping portion 14 is formed by initially turning the body 4 to the diameter of the lead portion 12, and then impressing a knurling tool against the cylindrical surface so formed to create the serrations 16. Since some of the metal is displaced in forming the serrations 16, the outer edges of the serrations 16 will be presented outwardly beyond the surface of the unknurled lead portion 12 and those outer edges will, of course, define a cylinder of larger diameter. Beyond the gripping portion 14 the body 4 is turned down in the provision of forward tapered section 18 which merges into a rear tapered section 20, the latter being tapered slightly more than the former so as to form a circumferentially extending rib 22 at the intersection of the two surfaces 18 and 20. The narrow end of rear tapered section 20 merges into a cylindrical end flange 24 at a shoulder 26, the flange 24 having the same diameter as the lead portion 12.

Figure 2:
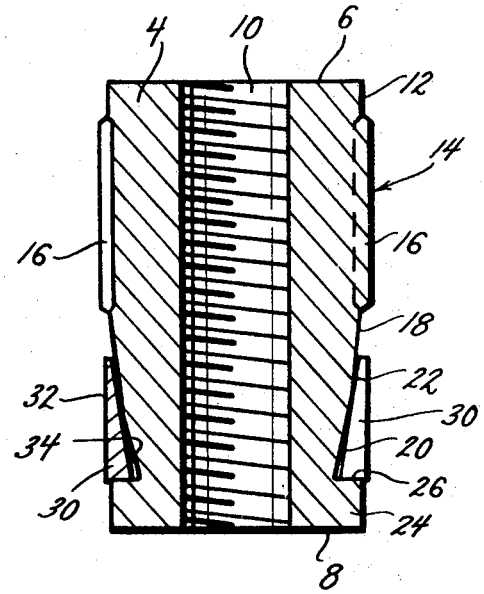
FIG. 2 is a sectional view taken along line 2-2 of FIG. 1.
Figure 3:
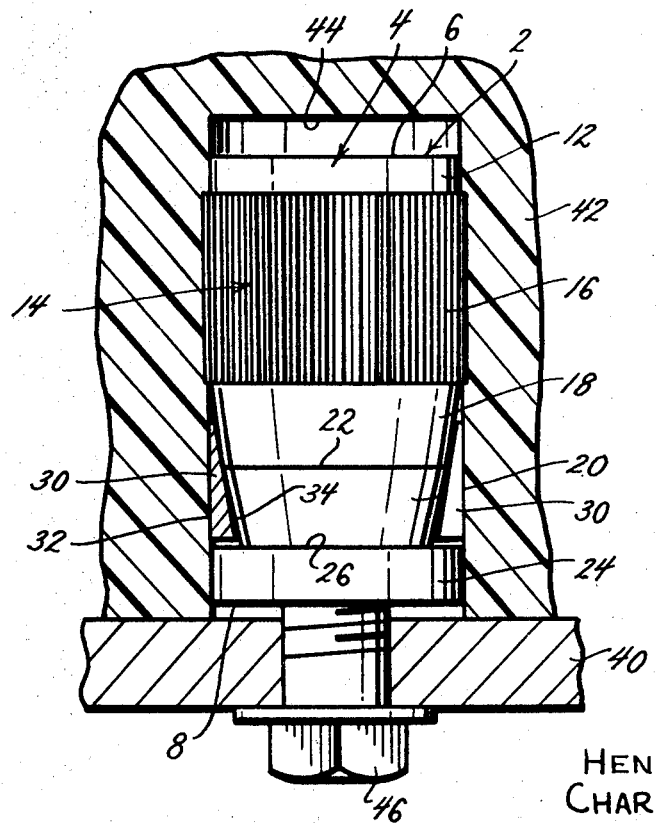
FIG. 3 is a sectional view showing the anchor installed in a base member for securing another member thereto.

The tapered sections 18 and 20 are embraced by a split locking ring 30 having a generally cylindrical outer surface 32 and a tapered inner surface 34 which is tapered slightly more than the forward tapered section 18 but slightly less than the rear tapered section 20 on the body 4. For example, if the angle between the tapered surface of the section 18 and the axial centerline of the body 4 is 3°, while the angle between the surface of the section 20 and the axial centerline is 5°, then the angle of the surface 32 relative to the axial centerline should be approximately 4°. Consequently, the tapered surface 32 will engage the body 4 only at the rib 22. The split ring 30 is preferably formed from steel which is tempered to impart a relatively high degree of resiliency to the ring 30. Moreover, the degree of resiliency should be sufficient to permit spreading of the ring 30 enough to allow it to pass over the flange 24 without yielding and still encircle the body 4 at the tapered sections 18 and 20 once the spreading force is released. Left undisturbed, the ring 30 by reason of its own resiliency and the presence of the tapered surface 34 against the rib 22 will assume a position on the body 2 in which its circular end edge abuts against the shoulder 26, thereby preventing further axial displacement of the ring 30 on the body 4. In this position, the cylindrical outer surface 32 will have a diameter slightly larger than the diameter of the lead portion 12 and end flange 24, but smaller than the diameter of the cylinder defined by the outer edges of the serrations 16. The rib 22 in that portion will engage the tapered inner surface 34 approximately midway between the circular ends of the ring 30 (FIG. 2).

The anchor 2 may be utilized for securing a detachable member 40 such as a plate to a base member 42 having an outwardly opening bore 44 which freely accepts the cylindrical lead portion 12, but not the gripping portion 14. The base member 44 is usually a relatively soft material such as a plastic or a non-ferrous metal which is incapable of retaining threads when those threads are subjected to substantial forces, although it may also be employed in steel and other harder substances. The bore 44 may be formed solely by a conventional twist drill, and reaming is not required to bring it to a precise dimension.

In use, the lead portion 12 is inserted into the bore 44 and once the axis of the body 4 is coincident to the axis of the bore 44, the anchor is either pressed or driven into the bore 44. In the latter case, a bolt 46 should be threaded partially into the threaded bore 10 of the body to prevent marring the trailing face 8 and obliteration of the threads in that portion of the bore 10 located adjacent to the face 8. As the anchor 2 advances into the bore 44 its serrations 16 cut into the walls defining the bore 44 and prevent rotation of the body 4 relative to the base member 42. Moreover, the serrations 16 as they bite into the wall of the bore 44 deform some of the material inwardly so that when the leading edge of the split locking ring 30 reaches the outer margin of the bore 44, the split ring 30 will be compressed inwardly by this deformed material and will tightly embrace the tapered sections 18 and 20 at the rib 22. The axially extending slit in the locking ring 30 permits it to yield inwardly still further under such compressive forces. The anchor 2 is forced completely into the bore 44, and when properly installed, its trailing face 8 should be slightly depressed from the outwardly presented surface of the base member 42 so that the body 4 can shift axially outwardly without projecting out of the bore 44.

Next, the bolt 46 is passed through the detachable member 40 and threaded into the threaded bore 10 of the body 4. When the head of the bolt draws up to the outer surface of the detachable member 40, the latter will be placed in compression and the force exerted by the member 40 in opposition to the bolt 46 will tend to withdraw the body 4 from the bore 44. This, in turn, will cause the rib 22 to shift toward the rear or trailing end of the ring 30 across the tapered inner surface 34 thereof, and since the surface of the tapered section 34 converges toward the member 40, the ring 30 will expand, forcing its outer cylindrical face 32 into even tighter engagement with the walls of the base member 42 defining the bore 44. By reason of the fact that the rib 22 is presented generally at the center of the tapered surface 34 on the ring 30, the expanding force will be applied at the center of the ring 30 and the frictional retaining force will be distributed evenly across the cylindrical face 32. Accordingly, the anchor 2 is secured firmly within the base member 42 during the initial force fit into the bore 44 and this fit is made even tighter once the bolt 46 is tightened against the detachable member 40.

The anchor 2 is also ideally suited as a substitute for stripped threads in steel and other substances as well. In such a case the stripped threads are drilled out, the size of the bore thereby formed being sufficient to accommodate the anchor 2 under a force fit as previously described. Thereafter, the anchor 2 is installed in the manner previously described.

Since the locking ring is compressed between the rib 22 and the walls of the bore 44 during the initial force fit, gravity is not required to position the locking ring 30 properly as is the case with the locking elements on some prior art devices, and therefore the anchor may be positioned upside down or at any desired angle in the base member 42. Inasmuch as the locking ring 30 embraces the body 4 even when the anchor 2 is completely withdrawn from the hole 44, the ultimate users of the anchor 2 need not be concerned with misplacing various parts or manipulating them separately during the installation procedure. Moreover, no specialized tools are required for installation, only a drill and a hammer or a press.

In lieu of the two intersecting tapered surfaces or sections 18 and 20, the body 4 may be provided with a single tapered surface having substantially the same degree of taper as the tapered inner surface 34 on the ring 30. Furthermore, the serrations 16 may be formed on the flange 24 behind the locking ring 30, instead of ahead of it.

It should be understood that the axially directed force required to expand the ring 30 may be supplied by means other than the bolt 46 threaded into the bore 44. For example, the body 4 may be provided with an axially extending stud which projects through the detachable member 40 and accepts a nut which bears against the detachable member 40. Similarly, the axial force may also be furnished by over-center clamps, wedge-type cotters, and similar force-inducing devices.

This invention is intended to cover all changes and modifications of the example herein chosen for purposes of disclosure which do not constitute departures from the spirit and scope of the invention.

We claim:

1. An anchor for securement in an outwardly opening bore, said anchor comprising a body of generally circular cross section sized for insertion into the bore, a pair of tapered surfaces on the body located axially with respect to each other thereon, the taper of one of the surfaces relative to the axial centerline of the body being greater than the taper of the other surface and the large end of the surface having the greater taper projecting no further outwardly on the body than the small end of the surface having the lesser taper whereby a rib is presented between the tapered surfaces on the body, a locking ring encircling the body and having a tapered interior surface presented toward the tapered surfaces on the body and an exterior surface sized for frictional engagement with the wall of the bore, the taper of the interior surface of the ring relative to the axial centerline of the body being intermediate in magnitude to the tapers of the tapered surfaces on the body but being different from either of these tapers, and the ring being oriented such that the larger end of its tapered interior surface encircles the surface of lesser taper on the body for urging the tapered surfaces on the body toward the small end of the tapered interior surface on the locking ring, and force-inducing means for shifting the body relative to the ring so that the locking ring will expand and secure the anchor in the bore.

2. An anchor according to Claim 1 wherein the body is provided with means for engaging the wall of the bore so as to prevent rotation of the body in the bore and wherein the force means comprises screw threads on the body, and a threaded element engageable with the threads on the body.

3. An anchor according to Claim 2 wherein the means for preventing rotation of the body in the bore comprises serrations on the body which cut into the wall of the bore as the body is forced into the bore, the serrations being offset axially from the locking ring.

4. An anchor according to Claim 3 wherein the serrations are preceded by a lead portion on the body, the lead portion fitting freely in the bore.

5. An anchor according to Claim 1 wherein the locking ring is a unitary structure; wherein the rib has an axial dimension substantially less than the axial dimension of the tapered interior surface on the ring and wherein the rib contacts the tapered interior surface on the locking ring approximately midway between the ends of that tapered interior surface.

6. An anchor according to Claim 5 wherein the rib is formed by the intersection of the two tapered surfaces on the body, and wherein the exterior surface of the ring is generally cylindrical.

7. An anchor according to Claim 6 wherein the locking ring is retained permanently on the body.

8. An anchor according to Claim 7 wherein the body is provided with a shoulder against which the locking ring endwise abuts as the body is inserted into the bore.

9. An anchor according to Claim 8 wherein the shoulder is located at the end of the tapered surface having the greater taper.

10. An anchor for securement in an outwardly opening bore, said anchor comprising a body sized for insertion into the bore, a locking ring encircling the body and having an exterior surface sized for frictional engagement with the wall of the bore as the body is inserted into the bore, force means for applying an axially directed force to the body for shifting it relative to the locking ring when the anchor is in the bore, and opposed and engaging camming faces on the body and locking ring for expanding the locking ring when the body is shifted axially relative to the ring by the force means, one of the opposed faces comprising a pair of tapered surfaces having different degrees of taper relative to the axial centerline of the body and merging at a rib, the other opposed face comprising a continuous tapered surface having a taper relative to the axial centerline of the body which is intermediate in degree to the tapers of the merging tapered surfaces but is different from either of these tapers whereby the continuous tapered surface will bear against the opposed camming face primarily at the rib thereon.

11. An anchor according to Claim 10 wherein the rib bears against the continuous tapered surface approximately midway between the ends of the continuous tapered surface; and wherein the exterior surface of the ring is generally cylindrical.